Dec. 30, 1947. S. C. HURLEY, JR 2,433,557
PHOTOELECTRIC APPARATUS FOR MEASURING THE
DIAMETER OF AN INFLATED FLEXIBLE CASING
Filed May 19, 1944 2 Sheets-Sheet 1
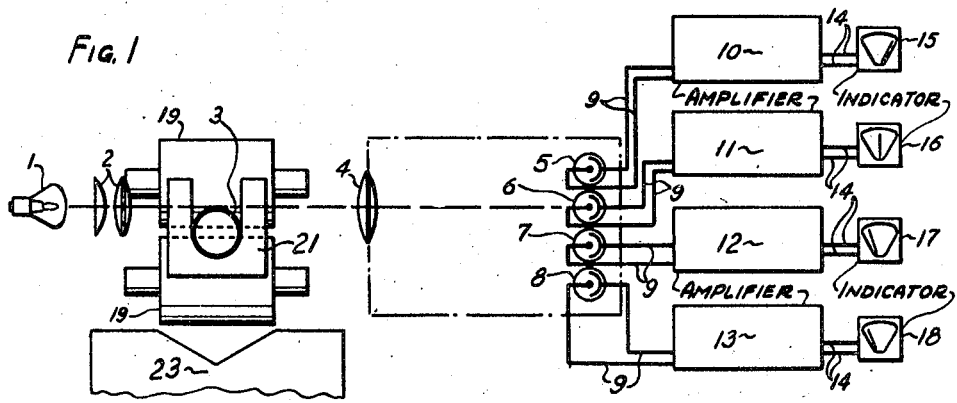
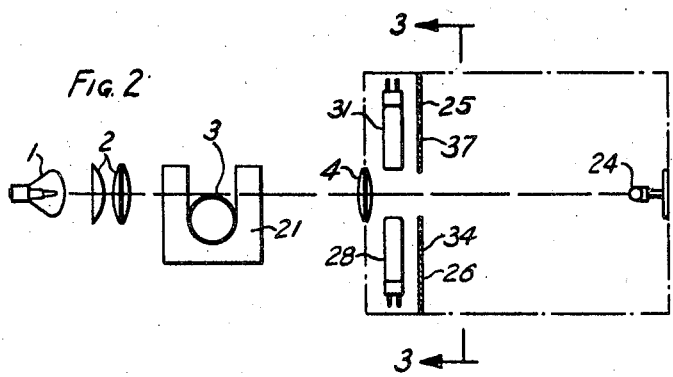
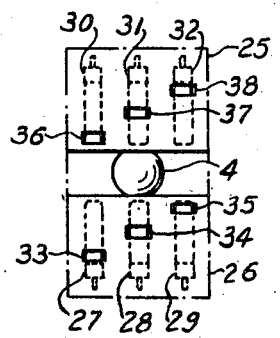
INVENTOR
SAMUEL C. HURLEY JR.
By Benedict & Swartwood
ATTORNEYS Dec. 30, 1947.            S. C. HURLEY, JR                2,433,557
           PHOTOELECTRIC APPARATUS FOR MEASURING THE
           DIAMETER OF AN INFLATED FLEXIBLE CASING
                  Filed May 19, 1944           2 Sheets-Sheet 2
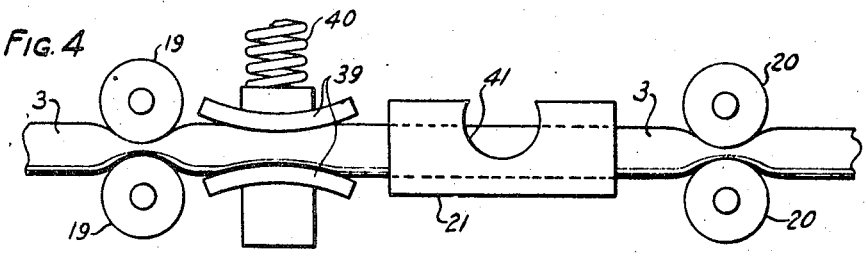
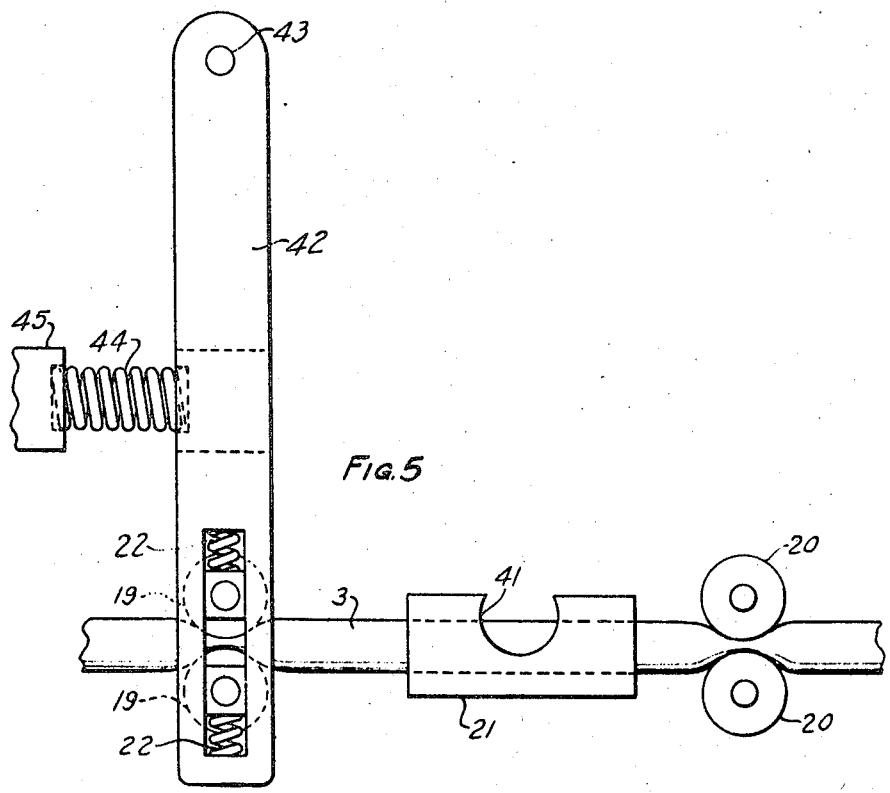
INVENTOR
SAMUEL C. HURLEY JR.
By Benedict & Swartwood
ATTORNEYS Patented Dec. 30, 1947

2,433,557

UNITED STATES PATENT OFFICE 2,433,557

PHOTOELECTRIC APPARATUS FOR MEASURING THE DIAMETER OF AN INFLATED FLEXIBLE CASING

Samuel C. Hurley, Jr., Danville, Ill.

Application May 19, 1944, Serial No. 536,290

2 Claims. (Cl. 88—14)

This invention relates to an improved apparatus for inspecting the diameter of flexible tubular casings and more particularly to a photoelectric sizing mechanism which will measure and indicate the diameter of the flexible casing.

My invention is suitable for measuring and indicating the diameter of any flexible casing and is especially suitable for indicating the size of sausage casings and the like. The sausage casings tested may be either synthetic or made of animal intestines.

Although either phototubes or photocells may be used in my invention, phototubes are preferable when used in conjunction with the amplifiers shown in Fig. 1. When photocells are used, it is preferable to eliminate the amplifiers and the photocells will be connected in conventional form directly to the indicators 15, 16, 17, and 18.

The phototubes are connected to a conventional amplifying and indicating mechanism. As the casing varies in size, as shown on the indicating means, it may be cut and sorted by hand or it may be cut and sorted automatically as will be explained later. It may also be cut automatically and sorted by hand.

An object of the invention is to maintain the proper tension on the inflated casing which prevents errors in inspection due to any leakage of the inflating medium from the casing.

There are many advantages of my invention over previous apparatus for the inspection of tubular casings and the like. In my invention, there are no mechanical parts in the actual inspection device which are subject to wear and corrosion. Casings made of animal intestines contain corrosive substances such as salts, fatty acids, etc., which would corrode any inspection device coming directly in contact with the casing. If jets of water or other fluid media are jetted over the surface of the natural casing to actuate a switch for determining the size of said casings, the fluid will dissolve out the corrosive substances from the casing and these corrosive substances will ruin the switching mechanism. Furthermore, a jet of liquid passing over the surface of the casing is not as accurate as the means used in my invention which comprises a beam of light passing over one surface of the inflated casing which casts a shadow on certain of the photoelectric tubes or cells. An additional advantage over mechanical or fluid inspection devices is that by my device I can measure a large number of different diameter casings in the same apparatus without changing any setting which is extremely difficult if not impossible to do with mechanical or fluid inspection devices.

Other objects and advantages of the invention will appear in the following description of the preferred embodiments of the invention shown in the attached drawings in which:

Fig. 1 is a schematic drawing showing the mechanical arrangement of the inspection device including the optical system and indicating device.

Figs. 2 and 3 are diagrammatic views illustrating an optical system for measuring a large number of different sized objects.

Figs. 4 and 5 illustrate specific means for maintaining the proper inflating tension on the tubular casing during the inspection.

Referring to the drawing, the device illustrated in Fig. 1 includes a source of light 1 shown as an electric incandescent lamp, although any other suitable source of concentrated light may be employed. The lamp 1 has its filament positioned substantially in the optical axis of a pair of condenser lenses 2 for concentrating the light of the source 1 upon the tubular casing 3 being passed through the beam of light from the condenser lenses 2.

A projecting lens 4 is arranged so as to have its optical axis in alignment with the optical axis of the condensing lenses 2 and is positioned upon the opposite side of the test or inspection zone through which the tubular casing 3 is passed. The projecting lens 4 preferably projects a sharply defined shadow of the casing being inspected upon one or more of a plurality of photoelectric tubes 5, 6, 7, and 8, depending upon the diameter of the casing.

Although only four photoelectric tubes are shown, any number may be used, depending upon the number of different diameter casings it is desired to test. Generally, one photoelectric tube is needed for each diameter casing to be tested. By a proper choice of projector lens 4, distance between lens 4 and the photoelectric cells and the number and spacing of the latter, any number of different diameter casings may be measured at any specified increments of diameter.

If large increments in diameter are desired to be measured, for a projector lens 4 having given optical characteristics, the tubes 5, 6, 7, and 8, etc., will be spaced farther apart; or the same result may be accomplished by keeping the same spacing between the tubes 5, 6, 7, and 8 and varying the optical characteristics of the projection lens 4.

It is also possible to arrange the photoelectric tubes in such a manner as to inspect relatively small increments in diameter in the relatively small diameter range and relatively large increments in diameter in the relatively large diameter range, or vice versa.

In other words, by properly spacing the tubes 5, 6, 7, and 8, an inspection may be made for varying increments in diameter for different size casings. The variation in increments measured need not be regular nor constant.

The photoelectric tubes 5, 6, 7, 8, etc., are connected through leads or conductors 9 in a suitable circuit to suitable electronic amplifiers 10, 11, 12, and 13. Amplifiers of this type are well understood devices and suitable types are procurable on the market. Since the specific construction and details of the amplifiers 10, 11, 12, and 13 are not material to the invention, they are illustrated conventionally in the drawing. The source of electric power to the amplifiers is conventional and is not illustrated.

Amplifiers 10, 11, 12, and 13 are connected through suitable leads or conductors 14 to indicator devices 15, 16, 17, and 18, respectively. The indicating devices 15, 16, 17, and 18 are illustrated conventionally as direct current meters connected in the output circuits of amplifiers 10, 11, 12, and 13, respectively. Any other suitable indicating devices may be used, such as lights, bells, flags, needles, recording meters, galvanometers, A. C. meters, etc.

Although separate amplifiers and meters connected to tubes 5, 6, 7, and 8 are shown, it is possible to connect tubes 5, 6, 7, and 8 to a common amplifier and indication device thru a proper common multi-point switch either automatic or hand controlled, connected by leads 9 to the tubes 5, 6, 7, and 8.

The method of operation for measuring different diameter casings may be described as follows: If tube 8 is arranged for the smallest diameter casing desired for inspection and such casing 3 is in place, tube 8 will be in shadow and tube 5 will be lighted. By means of amplifier 13, device 18 will indicate that object 3 is of a certain predetermined size. Indicators 15, 16, 17 will not be actuated since tubes 5, 6, and 7 are illuminated. The casing 3 may increase in size without effecting indicators 15, 16, and 17 until the next predetermined in size is reached when tube 7 is cast in shadow by casing 3 and indicator 17 is actuated, indicating the next increment in diameter.

As will be described later, the casings may be cut either by hand or automatically and sorted for each change in size.

The casing or flexible tubular object 3 is passed in distended or inflated condition through trough 21 by means of squeezing rolls 19 and 20 as illustrated in Fig. 4. The tension on rolls 19 and 20 is maintained by means of suitable springs properly positioned, such as the springs 22 illustrated in Fig. 6.

Referring again to Fig. 1, means are partly illustrated for preventing the fluid such as water within the casing from leaking out through pores in the casing with possible harmful contact with the inspection equipment. As mentioned previously, the water within the animal intestinal casings contains dissolved corrosive material and if it should leak or squirt out onto the inspection devices, great harm would occur. To prevent or minimize this harmful condition, water or other suitable liquid not shown, is continuously fed into inspection trough 21 and overflows into overflow trough 23.

Because of the corrosive nature of any water containing dissolved salts, etc., which may leak out of animal casings, inspection trough 21 may either comprise or be lined with (not illustrated) a chemical and corrosion resistant special metal alloy, glass or plastic which is available on the market.

The principle of my inspection device is illustrated in Fig. 1, but one of my preferred embodiments is best illustrated in Figures 2 and 3. Fig. 2 is an elevation and Fig. 3 is a partial sectional view along line 3—3 of Fig. 2, showing the arrangement of the photoelectric tubes. For ease in following, the same numbers are used in Figures 2 and 3 and in Fig. 1 wherever possible. Light source 1, condenser lens 2, casing 3, positioned in distended or inflated condition in inspection trough 21, and projection lens 4, are arranged and function in the same manner as in Fig. 1. The projection lens 4 preferably projects a sharply defined shadow of the casing 3 being inspected upon a magnifying mirror 24, shown as being a cylindrical mirror, although other types of convex or concave mirrors, including a spherical mirror, may be employed.

Photoelectric tubes 27, 28, 29, 30, 31, and 32 are positioned behind screens 25 and 26 provided with slots 33, 34, 35, 36, 37 and 38, which permit an image of the article 3 to be reflected from mirror 24 through the slots 33, 34, 35, 36, 37 and 38, onto one or more of the photoelectric tubes.

In Fig. 3, shields with slots are provided to mask a portion of the phototubes; however, each tube may be provided with its own mask with the proper opening to expose a portion of the tube.

Only six photoelectric tubes with corresponding slots are shown, but more may be used when desired. In the testing of sausage casings, it is usually desired to measure diameters in 2 millimeter increments from 10 millimeters to 40 which would require 15 tubes with corresponding slots. By using the mirror 24 which enlarges the image of the object being tested, and enclosing the tubes behind screens with corresponding slot openings, it is apparent that the entire range of diameters can be readily inspected in one compact apparatus without the changing of any setting.

Tubes 27, 28, 29, 30, 31, and 32 are connected with suitable amplifiers and indication gages, as illustrated in Fig. 1. As described in connection with Fig. 1, slot 38 has no light passing thru it when the article 3 is of the smallest desired size. Slot 37 has no light passing through it when article 3 is of the next size, and so on.

Referring to Fig. 4, one means of maintaining a flexible or non-rigid tubular casing in distended or inflated condition during the inspection operation is as follows: Casing 3 is passed through squeezing rollers 19, and through pressure plates 39 which maintain pressure on the tube 3 when distended, by means of spring 40.

After a little more of the casing 3 is passed through rollers 19, and before reaching rollers 20, the casing is filled with a fluid and then passed through squeezing rollers 20. Rollers 19 and 20 keep the casing containing the liquid fully distended at all times at its inspection point.

The pressure device 39 is for the purpose of maintaining the casing filled with water, and distended in inspection position in the trough 21 at all times. Casings made out of animal intestines or the like may have pores or holes in them which would permit some of the water in the casing to leak out, in which case, the casing would not be distended for a proper inspection. Pressure device 39 which rides on the casing will keep the casing fully extended at all times and will offset any leakage.

The squeezing rollers not only act to keep the casing distended, but if they are connected to a suitable power means (not shown), may rotate and provide the means for continuously passing the distended casing past the inspection point. The rollers may be only idlers and other conventional means may be substituted therefor. When one of the indicators in Fig. 1 shows that a different diameter casing is passing the inspection point or port, the casing may be cut by a knife or similar tool and it may be done either manually or automatically by conventional means not illustrated.

Fig. 5 illustrates another means which may be used in place of pressure plates 39 illustrated in Fig. 4. Where possible, the corresponding parts in Figs. 1 to 3 are numbered the same. Rollers 19 are rotatably attached to supporting arm 42, which can pivot about pin 43. Springs 22 maintain the rollers in squeezing position at all times. If there is any leakage of the liquid such as water out of the distended casing 3, the casing will be properly distended at the inspection point 41 by means of springs 22.

While I have described and disclosed the preferred embodiments of my invention, it is understood that the details may be varied and the description is not intended to limit the scope of my invention.

I claim as my invention:

1. An apparatus for inspecting distended flexible casings to ascertain the diameters, comprising a source of light, lens means for projecting light from said source through an inspection zone, a plurality of light sensitive devices positioned to receive said projected light, said inspection zone comprising a trough for receiving and positioning a portion of the length of a distended casing in such manner that the diameter of said casing controls the illumination of said light sensitive devices, indicating means responsive to the condition of illumination of said light sensitive devices for indicating the diameter of said casing, a pair of opposed members positioned adjacent each end of said trough and arranged to sueeze a casing to prevent passage of fluid from that portion of the casing between said pair of members to adjacent portions thereof, and means for applying pressure to fluid trapped within said casing by the said pairs of members at a point between said pairs of members and spaced from said trough in a manner to distend that portion of the casing within said trough.

2. An apparatus for inspecting distended flexible casings to ascertain the diameters, comprising a source of light, lens means for projecting light from said source through an inspection zone, a plurality of light sensitive devices positioned to receive said projected light, said inspection zone comprising a trough for receiving and positioning a portion of the length of a distended casing in such manner that the diameter of said casing controls the illumination of said light sensitive devices, indicating means responsive to the condition of illumination of said light sensitive devices for indicating the diameter of said casing, a pair of opposed members positioned adjacent each end of said trough and arranged to squeeze a casing to prevent passage of fluid from that portion of the casing between said pair of members to adjacent portions thereof and to apply pressure to fluid trapped within said casing between said pairs of members in a manner to distend that portion of the casing within said trough.

SAMUEL C. HURLEY, Jr.

REFERENCES CITED

The following references are of record in the file of this patent:

UNITED STATES PATENTS

| Number | Name | Date |
|---|---|---|
| 1,855,011 | DeMoss | Apr. 19, 1932 |
| 1,963,128 | Geister | June 19, 1934 |
| 2,085,671 | Powers | June 29, 1937 |
| 2,187,790 | Leavenworth | Jan. 23, 1940 |
| 2,200,960 | Leavenworth | May 14, 1940 |
| 2,372,162 | Ryan | Mar. 20, 1945 |

OTHER REFERENCES

"Die Kunstseide," for August 1931, page 283 cited. (Copy in Scientific Library, U. S. Patent Office.) (88–14 T.)